US009971987B1

(12) United States Patent
Banerjee et al.

(10) Patent No.: US 9,971,987 B1
(45) Date of Patent: May 15, 2018

(54) OUT OF ORDER DATA MANAGEMENT

(71) Applicant: Amazon Technologies, Inc., Reno, NV (US)

(72) Inventors: Soumyadip Banerjee, Seattle, WA (US); Ankit Saraswat, Seattle, WA (US); Prafulla Upadhyay, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 808 days.

(21) Appl. No.: 14/224,749

(22) Filed: Mar. 25, 2014

(51) Int. Cl.
*G06Q 10/00* (2012.01)
*G06Q 10/08* (2012.01)

(52) U.S. Cl.
CPC .................................. *G06Q 10/087* (2013.01)

(58) Field of Classification Search
CPC ....... G06Q 10/087; G06Q 10/00; G06F 17/30
USPC ............................................ 705/28; 707/758
See application file for complete search history.

(56) References Cited

U.S. PATENT DOCUMENTS

| 6,681,228 | B2 | 1/2004 | Balogh |
| 7,047,258 | B2 | 5/2006 | Balogh et al. |
| 7,167,877 | B2 | 1/2007 | Balogh et al. |
| 7,203,682 | B2 | 4/2007 | Balogh |
| 7,296,035 | B2 * | 11/2007 | Polan ................ G06F 17/30575 |
| 7,308,704 | B2 * | 12/2007 | Vogel ................... G06F 21/604 |
| | | | 726/1 |
| 7,350,237 | B2 * | 3/2008 | Vogel .................. G06F 21/6218 |
| | | | 707/999.009 |
| 7,853,609 | B2 * | 12/2010 | Dehghan .................... G06F 8/65 |
| | | | 707/778 |
| 9,003,490 | B2 * | 4/2015 | Orazi ...................... G06F 21/10 |
| | | | 726/26 |
| 9,342,697 | B1 * | 5/2016 | Ren ......................... G06F 21/60 |
| 9,430,514 | B1 * | 8/2016 | O'Shell ............ G06F 17/30362 |
| 2003/0084038 | A1 | 5/2003 | Balogh et al. |
| 2003/0093412 | A1 * | 5/2003 | Urkumyan ........ G06F 17/30592 |
| 2003/0204447 | A1 | 10/2003 | Dalzell et al. |
| 2004/0039646 | A1 * | 2/2004 | Hacker ................ G06Q 20/203 |
| | | | 705/22 |
| 2004/0064484 | A1 * | 4/2004 | Polan ................ G06F 17/30575 |

(Continued)

OTHER PUBLICATIONS

U.S. Appl. No. 14/223,403, filed Mar. 24, 2014, Titled: Orderless Data Management.

*Primary Examiner* — Oluseye Iwarere
(74) *Attorney, Agent, or Firm* — Kilpatrick Townsend & Stockton LLP

(57) ABSTRACT

Systems and methods for providing updates to a data store are described. A data store may receive, process and distribute update information in a substantially orderless manner. This may include implementing an "eventually consistent" design pattern, in which all operations include an object identifier associated with one of the objects in the data store, an information attribute identifier, an initial state, and a final state. Examples may include comparing the initial state included in the update instruction to a current state of one of the objects. If the initial state and the current state are the same, the current state of the object may be modified to match the final state of the update instruction. If the initial state and the current state are not the same, the update instruction may be sent to a redrive queue, from which the update may be reprocessed at a later time.

25 Claims, 7 Drawing Sheets

(56) References Cited

U.S. PATENT DOCUMENTS

| | | | |
|---|---|---|---|
| 2005/0044396 A1* | 2/2005 | Vogel | G06F 21/6218 726/6 |
| 2005/0044426 A1* | 2/2005 | Vogel | G06F 21/6218 726/19 |
| 2007/0030824 A1* | 2/2007 | Ribaudo | G01S 5/0018 370/328 |
| 2007/0260571 A1* | 11/2007 | Mansfield | G06F 17/227 706/48 |
| 2009/0132345 A1* | 5/2009 | Meyssami | G06Q 10/10 705/7.33 |
| 2010/0131296 A1* | 5/2010 | Knutson | G06Q 10/10 705/3 |
| 2010/0299669 A1* | 11/2010 | O'Cull | G06Q 10/0631 718/102 |
| 2012/0016849 A1 | 1/2012 | Garrod et al. | |
| 2012/0095974 A1* | 4/2012 | Bentkofsky | G06F 17/30371 707/703 |
| 2012/0123949 A1 | 5/2012 | Gupta et al. | |
| 2012/0150816 A1* | 6/2012 | Pafumi | G06F 11/1441 707/679 |
| 2013/0204886 A1* | 8/2013 | Faith | G06Q 30/0631 707/756 |
| 2014/0149491 A1* | 5/2014 | Rivadalla | H04W 4/023 709/203 |
| 2014/0181129 A1* | 6/2014 | Thomas | G06F 17/30861 707/758 |
| 2015/0046389 A1* | 2/2015 | Dhayapule | G06F 17/30563 707/602 |
| 2017/0039243 A1* | 2/2017 | James | G06F 17/30442 |

\* cited by examiner

| Item Identifier 411 | |
|---|---|
| Attribute Identifier 412 | Current State 414 |
| Attribute Identifier 422 | Current State 424 |
| Attribute Identifier 432 | Current State 434 |
| Attribute Identifier 442 | Current State 444 |

410

| Item Identifier 451 | | |
|---|---|---|
| Priority Identifier 452 | Merchant Identifier 453 | |
| Attribute Identifier 462 | Initial State 464 | Final State 466 |
| Attribute Identifier 472 | Initial State 474 | Final State 476 |

OUT OF ORDER DATA MANAGEMENT

BACKGROUND

Multi-tenant data stores are used in environments where multiple entities store and/or manage their data in a common repository. These may be used, for example, in cloud storage applications, e-commerce platforms (e.g., "virtual storefronts"), online service providers, resource management services, and other situations. To maintain data consistency, such systems may rely on updates from tenants being processed in the order they were received. However, in many instances, the chance of out of order messages being received at various nodes in the system increases as database size and complexity increases, requiring additional processing or other safeguards to ensure that the eventual state of the data store is consistent and correct.

BRIEF DESCRIPTION OF THE DRAWINGS

Various embodiments in accordance with the present disclosure will be described with reference to the drawings, in which:

FIG. 4 illustrates aspects of a listing, an update instruction and a transaction record, according to at least one other example;

DETAILED DESCRIPTION

Figure 1:
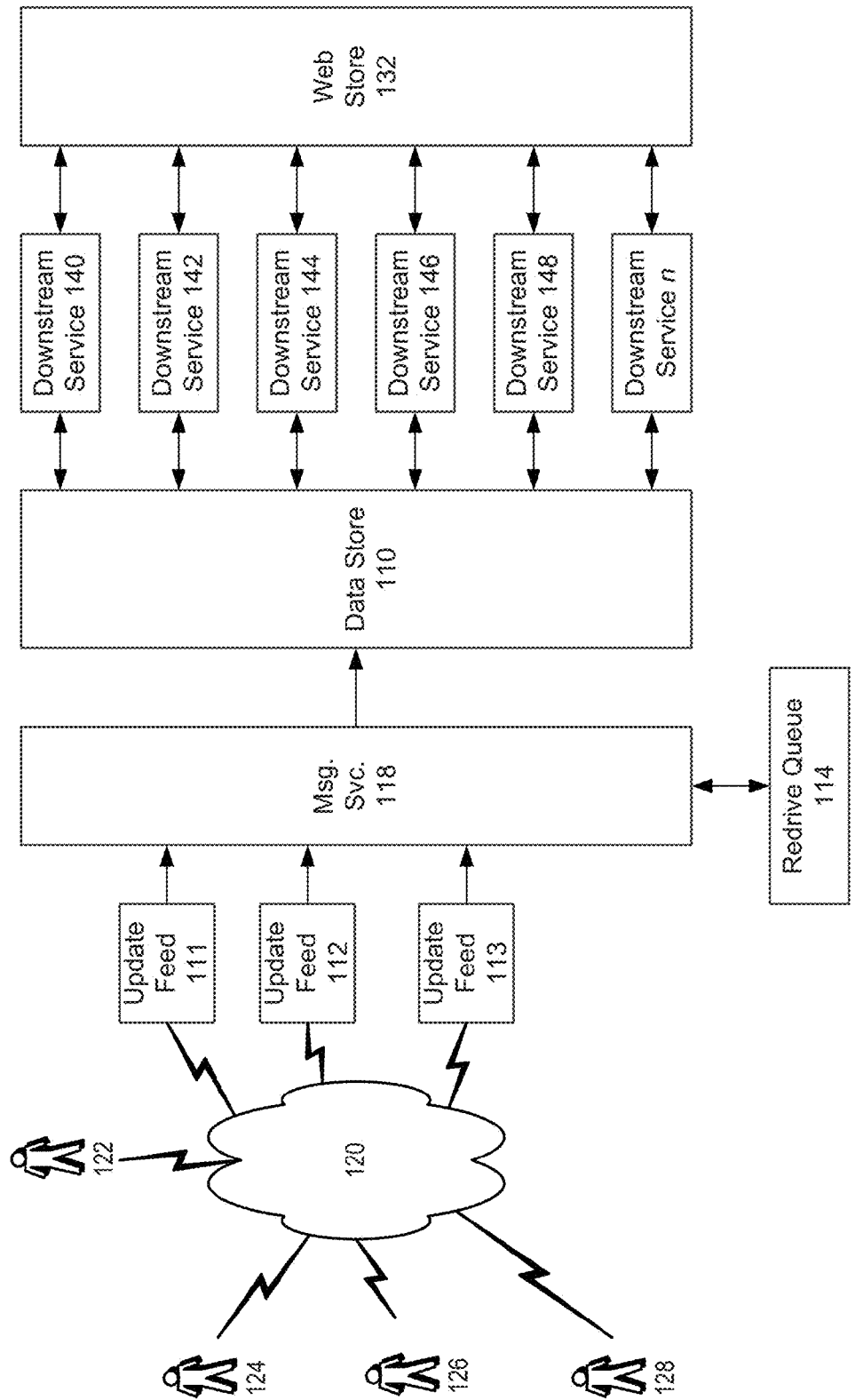
FIG. 1 illustrates a multi-tenant environment including an authoritative data store, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain aspects of the disclosure, update instructions for information objects are received by a service provider from various tenants of a multi-tenant data store. Each of the update instructions may include information indicating an initial state of the information object and a final state of the information object, e.g. what the information object was when the update instruction was created and what the information object should be after the change. The service provider may determine whether to apply a given update instruction by comparing the initial state information included with the update instruction with the current state of the information object in the data store. If the initial state information included with the update instruction does not match the current state of the information object in the data store, then the update instruction may be sent to a queue for later processing. By applying this methodology consistently for all update instructions, eventual consistency in the data store can be obtained without the use of timestamps or other processing/storage intensive techniques.

In some examples, an authoritative data store may be provided that receives, processes and distributes update information in an orderless manner. This may include implementing an "eventually consistent" design pattern throughout a processing pipeline, in which messages (e.g. update instructions) in the pipeline include an initial state and a final state. If a message in the event handler thread has the same initial state as the state in the data store, the message is processed and the state of the data store is changed to the final state of the message. In some examples, this may be done as a single transaction. On the other hand, if the initial state of the message is not the same as the state in the data store, the message may be placed in a redrive queue, where it will also be processed, e.g. after a certain time window. By recycling update operation messages with these features, the inventors have found that eventual consistency in the data store can be reliably obtained with at least some reduced processing requirements.

In some examples, the authoritative data store may communicate with downstream systems using dedicated channels that provide authoritative changes, without sidewise dependencies, e.g. if the downstream systems employ a similar model and/or if the authoritative data store manages the order of the downstream updates.

According to further aspects of the disclosure, an electronic marketplace (managed by a service provider) may be provided that hosts a plurality of merchants and includes a data store with listings for items that the plurality of merchants are offering for sale. In some examples, each of the listings may include a plurality of information attributes.

Some examples may include receiving a first update instruction from one of the merchants. The first update instruction may include at least an item identifier associated with one of the listings in the data store, an information attribute identifier, an initial state and a final state.

Examples may include comparing the initial state included in the first update instruction to a current state of one of the listings. If the initial state and the current state are the same, then the current state of the listing may be modified to match the final state of the first update instruction. If the initial state and the current state are not the same, then the first update instruction may be sent to a redrive queue, from which the first update instruction may be reprocessed at a later time.

Some examples may include receiving a second update instruction from the redrive queue. The second update instruction may include at least the item identifier associated with the one of the listings, the information attribute identifier, an initial state and a final state.

Examples may include comparing the initial state included in the second update instruction to the current state of one of the listings. If the initial state included in the second update instruction and the current state are the same, then the current state of the listing may be modified to match the final state of the second update instruction. If the initial state and the current state are not the same, then the second update instruction may be sent back to the redrive queue.

Some examples may include forwarding the first and/or second update instruction to at least one downstream service based at least in part of whether the current state was modified to match the final state.

In some examples, the downstream services may be configured to periodically pull updates from the data store and/or may be configured to apply all update instructions that they receive from the data store.

In some examples, the downstream services may be configured to determine whether to execute update instructions that they receive from the data store based at least in part on whether initial state information included in the update instructions matches current state information in the downstream services.

Some examples may include receiving a third update instruction including at least the item identifier; wherein the first update instruction may be an instruction to modify an existing listing and the third update instruction may be an instruction to create a new listing. In some examples, the data store may send the first update instruction to the redrive queue until a new listing is created based at least in part on the third update instruction.

Some examples may include setting a predetermined time that the first update instruction will be maintained in the redrive queue, such as a timeout value, and determining whether to delete the first update instruction based at least in part on a time that the first update instruction has been maintained in the redrive queue and the predetermined time or timeout value.

In some examples, the data store may be configured to separate the first update instruction for independent execution from a plurality of update instructions received together from the merchant.

According to further aspects of the disclosure, a web service may be provided that hosts a plurality of users and includes a data store with information objects associated with the plurality of users. In some examples, each of the information objects may include a plurality of information attributes.

In some examples, a first update instruction may be received from one of the users. The first update instruction may include, for example, an object identifier associated with one of the information objects in the data store, an information attribute identifier, an initial state and a final state. Examples may include comparing the initial state to a current state of the one of the information objects, as discussed above with respect to updating the item listings.

In some examples, the web service may include a virtual storefront that may be accessible by customers, and that obtains information about items offered for sale corresponding to the information objects from the downstream services.

In some examples, a second update instruction may be received including at least the item identifier. In some examples, the first update instruction may be an instruction to modify an existing information object and the second update instruction may be an instruction to create a new information object. In some examples, the data store may send the first update instruction to the redrive queue until a new information object is created based at least in part on the second update instruction.

In some examples, a timeout value may be set, and a determination regarding whether to delete the first update instruction may be made based at least in part on a time that the first update instruction has been maintained in the redrive queue and the timeout value.

According to further aspects of the disclosure, a plurality of messages including update instructions from the users may be received, each of the update instructions including, for example, an object identifier associated with one of the information objects in the data store, an information attribute identifier, an initial state, and a final state. In some examples, the update instructions may be processed, independent of the order in which the plurality of messages were received, based at least in part on comparing each of the initial states included in the update instructions to a current state of the one of the information objects.

In some examples, if the initial state of a particular update instruction and the current state of the information object are the same, then the current state of the information object may be modified to match the final state of the particular update instruction. In some examples, if the initial state of the particular update instruction and the current state of the information object are not the same, then the particular update instruction may be sent to a redrive queue, from which the particular update instruction may be reprocessed at a later time.

Examples may include processing the update instructions independent of the order in which the plurality of messages were received, based at least in part on comparing each of the initial states included in the update instructions to a current state of the one of the listings.

In some examples, at least some of the update instructions may be sent to one or more downstream services. The web service may include, for example, a web page accessible by customers to purchase items associated with the information objects, and the web page may retrieve information from at least one of the information objects maintained by data store or information objects maintained by one or more downstream services.

According to further aspects of the disclosure, a computer-readable storage device may be provided storing computer-executable instructions that, when executed by one or more computer systems, configure the one or more computer systems to perform operations described herein.

As used herein, web services should be broadly understood as applying to various public and/or private network (e.g., the Internet) services including, for example, distributed databases, cloud storage, e-commerce, publishing, or similar services supported by network and/or web-based storage. In some examples, a given web service may be associated with a particular webstore or virtual storefront for a particular merchant.

In some examples, a web service such as a website, a virtual storefront, a webstore, etc., may be provided as part of an electronic marketplace, and may be managed by one or more service provider computers (e.g., servers) that host electronic content in the form of, for example, an electronic catalog, with or without associated purchase and billing functionality, may be provided for various merchants or tenants. Customers may access the web service, e.g., a virtual storefront, to view, review, discuss, order and/or purchase items (e.g., physical items or services) from the web service.

In some examples, a web service, such as a cloud storage service, may be provided to various entities/tenants including, educational, government, corporate or individual customers, and may be managed by one or more service provider computers (e.g., servers) that provide web portals, APIs and the like, through which the customers can upload, modify and/or retrieve data or executables to, or from, remote databases.

The techniques described above and below may be implemented in a number of ways and in a number of contexts. Several example implementations and contexts are provided with reference to the following figures, as described below in more detail. However, the following implementations and contexts are but a few of many.

Turning to FIG. 1, an example of a network environment including an authoritative data store 110, according to aspects of the disclosure, is provided. As shown in FIG. 1, the authoritative data store 110 may be accessed via a message handling service 118 to create new items and to update existing items using update feeds 111, 112, 113, etc. The authoritative data store 110 may be managed by a service provider and may be implemented using one or more servers under the management or control of the service provider.

The service provider may provide an electronic marketplace, or other web service, that hosts multiple tenants, represented by users 122-128. The users 122-128 may access the authoritative data store 110, e.g. to create or change listings, via network 120 using tools and/or services provided by the authoritative data store 110. For example, the service provider may provide integrated web service API that help merchants, or other sellers, to exchange data on listings, orders, payments, reports, etc. XML data integration may enable high levels of selling automation, allowing merchants to increase selling efficiency, reduce labor requirements and improve response time to customers. In some examples, the authoritative data store 110 may provide a shared database including myriad listing for many different merchants or other users of the authoritative data store 110.

In some examples, API functions provided by the authoritative data store 110 may integrate listings, orders and payment data into existing workflows of the users 122-128 so that selling products in the electronic marketplace can fit with users' existing practices.

In some examples, updates instructions sent by users 122-128 may include one or more of an item identifier associated with one of the listings in the data store 110, an information attribute identifier, an initial state and a final state. These may be applied, for example, by API or other program(s) running on client-side devices, and, in the case of the initial state, may be based on a last known state of a particular item attribute and/or may be obtained by querying one or more of message handling service 118, data store 110 and/or web store 132.

Authoritative data store 110 may directly or indirectly support a web store 132, which may also be managed by the service provider. Web store 132 may represent a web service and may include various features that allow the service provider to assume one or more roles/tasks that would otherwise be handled by the merchant. For example, one or more of payment, shipping, restocking, order assembly and/or aggregation, service quotes, and various other services may be provided by the service provider, or by any number of downstream services 140-n, on behalf of the merchant, with or without individual consumers of the web service being aware of the service provider's role. Such support may include, for example, all manner of e-commerce support known in the art, which are not described exhaustively herein.

In some examples, fulfillment API provided by the electronic marketplace may allow merchants to access fulfillment capabilities of the service provider through a web services interface. For example, a merchant may be enabled to send order information to the service provider with instructions to fulfill customer orders on the merchant's behalf, among other features.

In some examples, merchants registered for fulfillment by the service provider (FBSP) may send inventory to service provider's fulfillment centers. When orders are placed on the service provider site, e.g. the web store 132, or when a merchant sends order information for orders placed through another sales channel, the service provider and/or any of downstream services 140-n may pick, pack and ship the products to the merchant's customers.

The authoritative data store 110 may support the management of users 122-128 listing items to be sold on the web store 132 in various ways. Listings can be added, deleted, or modified by the merchant(s) by a variety of specialized feed formats configured to meet a wide range of merchant needs. For example, new products can be added to the electronic marketplace catalog by using first feed channel(s), such as update feed 112, to define new product detail pages on the web store 132. In some examples, high volume changes, such as product price and quantity updates, can be updated using a simplified price and quantity feed channel, such as item update feed 111, that minimizes the data that merchants must provide. In some examples, item update feed 112 and item update feed 111 may use different formats suited to the channel's data needs.

As discussed further herein, create and/or update requests received by message handling service 118 from users 122-128 via update feed 111, 112 and/or 113 may include state information included in a message wrapper to facilitate substantially orderless, eventually consistent, processing. In some examples, create and/or update requests received from users 122-128 via update feed 111, 112 and/or 113 etc. may be bundled in various ways that can include, for example, multiple new item requests, multiple changes associated with a particular item, different changes for different items, etc. In such cases, individual requests may be unbundled for individual execution by the message handling service 118 when received.

In some examples, the update requests may analyzed by message handling service 118 for what specific attribute of an identified item is to be changed. For example, item listings in the data store 110 may include attributes such as cost, inventory, shipping, or other information, any one or more of which may be the subject of an item update instruction. In some examples, each attribute included in a update request may include initial state information, such that, if compared by message handling service 118 to current state information for the attribute in the database, a determination on whether to accept or suspend the change can be made the by message handling service 118.

In some examples, the message handling service 118 may communicate with, or include, a redrive queue 114, e.g. for buffering update instructions for later processing as discussed further herein.

It should be noted that, in the example shown in FIG. 1, the message handling service 118 and data store 110 are not limited to supporting an electronic marketplace, and may be configured to support, for example, various web-based, or other networked, operations such as cloud storage, service support, etc., for users 122-128. Each of users 122-128 may be assigned a profile including various parameters that may be used to process create and/or update instructions received through item update feeds 111, 112, 113, etc.

The data store 110 may also provide new item and update information to various downstream services 140-148 (or any number of downstream services n), which may directly or indirectly support web store 132. Downstream services 140-148 may include, for example, a separate offer listing service, an availability aggregator, a shipping configuration service and/or media service. Such services may be used for various purposes in the support of processing sales, delivery of items, feeding media to a user's virtual storefront, etc. In some examples, downstream services 140-148 are each provided a dedicated channel by which updates and/or new item instructions may be delivered from data store 110.

In some examples, updates that are executed and/or validated by data store 110 may be sent, in parallel, to more than one of downstream services 140-148. In such situations, each of the downstream services 140-148 to which the update is sent may implement the change, without reference to any of the other downstream services. As such, each of downstream services 140-148 may be self-contained, independent and isolated, with respect to the other downstream services.

In some examples, one or more of downstream services 140-148 may be configured to pull update information from the data store 110 on a periodic, or as needed, basis. This may include, for example, requesting updates that pertain to particular items that are stored by the individual downstream service, or the data store 110 may have records that automatically identify relevant updates that pertain to a requesting downstream service. In some examples, downstream services 140-148 may be configured to apply all updates received from the data store 110, or they may be configured to determine whether such updates should be applied using techniques such as those described herein.

In some examples, downstream services 140-148 may also communicate with web store 132, or other services, via separate and/or shared channels, e.g. in response to requests, to provide support to individual transactions, to serve content, etc. However, in some examples, the data records associated with the data store 110 may not be changed via such communications or channels. Instead, changes may be communicated authoritatively via the dedicated channels with data store 110.

It is also noted that there may be any number of users, web stores or downstream services supported by the example shown in FIG. 1. Additionally, although shown as individuals for ease of description, in some examples, the data store 110 may be configured to allow a user/tenant to create and manage multiple users (e.g., multiple employees), under a single account and to manage associated item listings.

Figure 2:
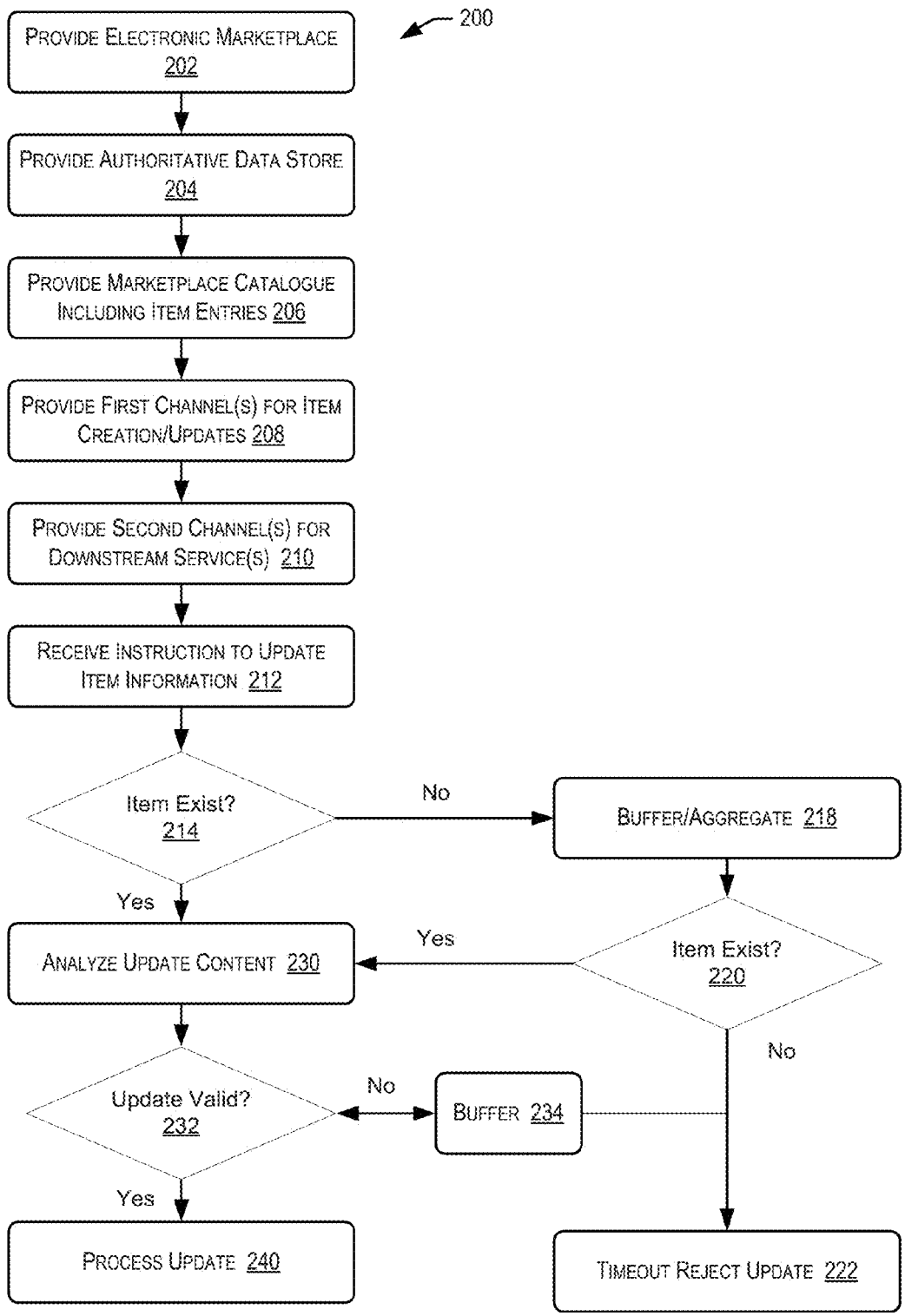
FIG. 2 is a flow diagram depicting an example flow including updating an authoritative data store as described herein, according to at least one example.
Figure 3:
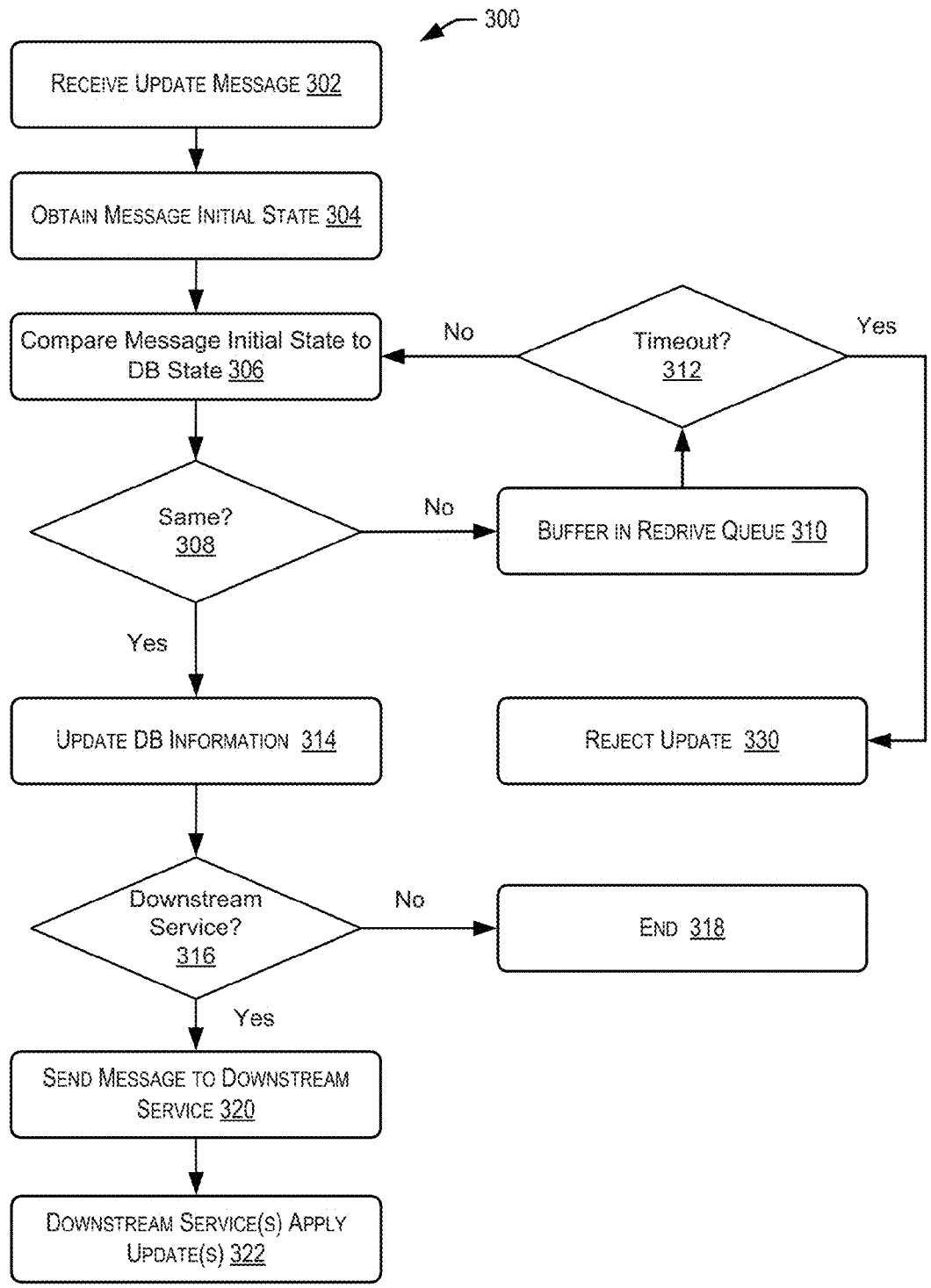
FIG. 3 is a flow diagram depicting an example flow including updating an authoritative data store and a downstream services as described herein, according to at least one other example.

FIGS. 2-4 illustrate example flow diagrams showing respective processes 200, 300 and 400 for implementing processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 2 depicts an illustrative flow 200 in which techniques for managing an authoritative data store may be implemented. In illustrative flow 200, operations may be performed by one or more processors of one or more service provider computers and/or instructions for performing the operations may be stored in one or more memories of the service provider computers.

The flow 200 may begin at 202, in which an electronic marketplace, or other web service, may be provided by a service provider. The electronic marketplace may include, without limitation, the various services described herein, and may host a plurality of merchants. In some examples, the service provider may provide the option for the merchant to purchase, license, or otherwise acquire, all of the code necessary to establish a website, webstore, etc., from the service provider.

The flow 200 may optionally continue with 204, in which the service provider may establish an authoritative data store for the electronic marketplace. In some examples, the authoritative data store may be configured as a substantially stateless machine, at least with respect to update instructions and messages as described further herein. In some examples, the authoritative data store may include data in a marketplace listing format, including any number of attributes for individual entries/items included in the data store. In the context of web stores selling physical items, such attributes may typically include at least item cost, shipping and inventory information. However, many more attributes are also possible, and different attributes may be applied to services, streaming content, digital media, or other marketable items.

The flow 200 may optionally continue with 206, in which a catalogue for the marketplace may be provided, including, for example, item entries for each of the items offered for sale by the electronic marketplace, e.g. with listings for items that the plurality of merchants are offering for sale and/or that the service provider is offering for sale. In some examples, the information for the catalogue may be obtained from the authoritative data store and/or other downstream services, and may include any number of the attributes previously mentioned. The catalogue may be coupled with a web store, such as web store 132 shown in FIG. 1, that allows any to all of the functions associated with such services.

The flow 200 may optionally continue with 208, in which the service provider may establish one or more first channels for processing item creation and/or item update requests, such as those discussed previously. In some examples, 208 may include creating separate channels for the instructions to create new listings of items for sale, and for the instructions to update existing listings of items for sale. In some examples, the channels for the instructions to create new listings of items for sale, and for the instructions to update existing listings of items for sale may use different protocols.

The flow 200 may optionally continue with 210, in which the service provider may establish one or more second channels for communicating with downstream service providers. In some examples, 210 may include creating at least one dedicated second channel for each of the downstream services that the electronic marketplace provides authoritative updates to. In some examples, the second channels may use a different protocol than any of those used in the first channels.

The flow 200 may optionally continue with 212, in which an instruction to update item information in the authoritative data store is received by the service provider servers. In some examples, the instruction may be received from one of the merchants or other authorized third party, via the at least one first channel, and may include one or more of an item identifier associated with one of the listings in the data store, an information attribute identifier, an initial state and a final state. Particular attributes may include, for example, changes in inventory, change in price, add/change listing, change images, speed of shipping or other shipping parameters, etc.

In some examples, the instruction to update item information may be bundled with other such requests and/or with one or more item create request.

The flow 200 may optionally continue with 214, in which a determination may be made regarding whether the item that the update is directed to exists in the authoritative data store. This may be done, for example, by referencing a SKU or other unique identifier included in the update instruction.

It is noted that, in addition to processing updates to existing database entries, the present subject matter also contemplates processing updates to database entries that have not yet been created. For example, a merchant may add an item to their catalogue, and subsequently add updates, e.g. modified or new information, to that item. In the event that the changes are processed before the create command, the present subject matter allows various means by which the update can be suspended, and not simply rejected as applying to an unrecognized item.

For example, if it is determined that the item does not exist in the authoritative data store, the flow 200 may proceed with 218, in which the update instruction may be buffered, or aggregated with other such instructions, for a period of time. In some examples, the time may be limited by the main memory resources of the service provider servers that process the update instructions.

Upon expiration of the available time, or according to an applied schedule, the flow may proceed with 220, in which one or more additional check(s) may be made regarding whether the subject item exists.

If the one or more checks at 220 finally result in a negative response, e.g. after a predetermined timeout, the flow 200 may continue with 222, in which the update instruction is rejected.

On the other hand, if the one or more checks at 220 result in a positive response, or if check 214 confirms the existence of the subject item, the flow 200 may continue with 220, in which content of the update instruction may be analyzed.

Analyzing the content of the update instruction may include, for example, scanning the update instruction for any initial state information included therein. In some examples, if initial state information is not included, alternative processing may be provided, e.g. in an attempt to process the instructions by relying on timestamp or other information.

The flow 200 may optionally continue with 232, in which a determination may be made regarding whether the update is valid. This may be done, for example, by comparing the initial state information included in the update instruction with current state information of the listing, as discussed more fully herein.

If it is determined that the update is not presently valid (e.g. the initial state information included in the update instruction does not match the current state information of the listing), the flow 200 may proceed with 234, in which the update instruction is buffered. This may include, for examples, sending the instruction to a redrive queue as in FIG. 1 for later processing.

On the other hand, if the check at 232 indicates that the update instruction is valid, the flow 200 may optionally continue with 240, in which the update instruction may be processed, e.g. applied to the authoritative database such that the current state of the subject attribute is changed to the final state of the update instruction, and/or the update instruction may be distributed to one or more downstream services as discussed herein.

If the update instruction times out in either of 232 or 234, the flow 200 may continue with 222 in which the update instruction is rejected.

Additional details regarding possible steps that may be implemented in implementing updates to an authoritative database are discussed further below with reference to FIG. 3. In illustrative flow 300, operations may be performed by one or more processors of one or more service provider computers and/or instructions for performing the operations may be stored in one or more memories of the service provider computers.

The flow 300 may begin at 302, in which an update or create instruction is received, e.g. according to 212 in FIG. 2.

The flow 300 may continue with 304, in which initial state information may be obtained from the update message, e.g. from a message wrapper.

The flow 300 may continue with 306, in which the initial state information may be compared to database current state information.

The flow 300 may continue with 308, in which a determination may be made regarding whether the initial state information from the message matches the current state information from the database.

If the initial state information from the message does not match the current state information from the database, the flow 300 may continue with 310, in which the update instruction may be buffered in a redrive queue. After a dynamic or predetermined period of time, the flow 300 may continue from 310 to 312, in which a determination may be made regarding whether the update instruction has expired, e.g. based on a predetermined time or timeout value. This may be based on, for example, a predetermined period of time that the system is set to keep update instructions live before discarding, and/or a time included with the update instruction. In some examples, the predetermined period of time may be a number of days, such as 14 days, 10 days, 7 days, or 1 day. In other systems, e.g. those with rapid update times and relatively short queues, the predetermined period of time may be substantially less, such as a number of hours or minutes, such as 12 hours, 6 hours, 1 hour, 40 minutes, 30 minutes, 15 minutes, etc.

Additionally, an update may be determined to be expired based on a number of times it has been called for processing. For example, any update instruction that has been called 3 times, 5 times, 10 times, etc., may be determined to be expired. The time and/or number of iterations required for expiration may be dynamic and may be adjusted in substantially real time by a machine monitoring, for example, the number of update instructions in a database queue, an average processing time for updates received by the database, etc.

If the update has expired in 312, the flow 300 may continue with 330 in which the update is rejected.

If the update has not expired in 312, the flow 300 may continue by returning to 306, and again comparing the initial state information to the database current state information, i.e. to see if the database current state information has changed to match the initial state information.

If it is determined in 308 that the initial state information matches the database current state information, the flow 300 may continue with 314, in which the update may be applied to the database, e.g. by modifying the current state information to match the final state information included in the update instruction.

In some examples, this may include creating a listing for an item, and/or modifying one or more attributes of an item, or other data object, included in the authoritative data store, such as authoritative data store 110 shown in FIG. 1. As discussed previously, such create/update operations may be processed in a data pipe without ordering such operations based on the order in which they are received by the data store or the downstream services.

It should be appreciated that, based on the foregoing methods, and others discussed herein, it is possible to process instructions essentially regardless of the order in which they were received and without referring to timestamp information included in the instructions. In addition, the database need not maintain timestamp information on a per-attribute basis, thereby reducing the amount of operations that are required to reorder instructions and/or update timestamp information throughout a given listing as individual fields are updated.

The flow 300 may optionally continue with 316, in which a determination may be made regarding whether the update instruction should be sent to one or more downstream services. This may involve, for example, determining whether the update instruction has been applied to the database, whether any downstream services have corresponding listings, whether a sufficient amount of time has passed to ensure that that the update is currently valid, etc. This may be determined, for example, according to records maintained by the authoritative data store indicating on an item and/or attribute level, what downstream services maintain what data.

The flow 300 may optionally continue with 320, in which downstream services that the update and/or create instructions needs to be applied to may be determined.

The flow 300 may optionally continue with 320, in which the validated update instructions from 314, 316 are applied to a queue of pending updates to one or more downstream services. In some examples, an individual queue may be assembled and applied to multiple downstream services and/or individual queues may be assembled for each downstream service.

In some examples, a position of the validated instruction in the queue may be determined based, at least in part, on previous update and/or create instructions received from a particular merchant. For example, update/create slots within a given queue may be filled according to "first come, first serve" or according to algorithms that recognize a merchant's update and/or create instruction activity, and that ration queue slots according to previous usage.

In these ways, and others, the service provider may effectively "level the playing field" in a multi-tenant data store environment, e.g. by applying a uniform policy for all merchants, and decoupling how often the merchant sends updates with how often they get updates propagated. Some examples may include forwarding the update and/or create instructions to a downstream service via a service channel dedicated to that downstream service.

In some examples, the update and/or create instructions that are sent to the downstream service(s) may not include information that was previously used to validate the instruction by the authoritative server. For example, in embodiments where one or more of the downstream services are configured to execute all update instructions received from the data store, regardless of initial state information, such information may be omitted from the instructions that are sent to one or more of the downstream services. However, in some examples, a downstream service may determine whether or not to execute update instructions based on initial state information, as done at the data store. In those situations, the instructions received by the downstream service may include initial state information, or the like, applied by the merchant, the data store, an intermediary, or the downstream service.

The flow 300 may optionally continue with 322, in which the update and/or create instructions are applied by the downstream service(s). In some examples, the downstream services may be configured to execute instructions that they receive from the service provider server, and/or via the dedicated service channel, regardless of whether it includes information used by the authoritative data store to validate the instructions.

In some examples, the downstream service may maintain a full or partial copy of one or more of the listings that are maintained by the data store. Thus, relevant updates can be applied or new listings created based on the instructions provided by the data store. For example, if an update instruction is directed to a certain listing and/or a certain information attribute of a listing, the data store may identify downstream services that maintain a copy of the relevant listing and/or information attribute, and forward the update instruction to the appropriate downstream services, where the updates may be applied, as needed.

In some examples, the downstream services may be configured to execute instructions that they receive from the data store, the service provider server, and/or via the dedicated service channel, independently of (e.g. without sidewise checks from) other downstream services.

In some examples, the downstream services may further report completion of their updates to the authoritative data store.

FIG. 4 illustrates certain aspects of an exemplary listing 410, and an update instruction 450. The elements depicted as included in these items are not intended to be limiting and it is to be understood that such records may include any number of elements such as those described herein, and similar record elements known by those of skill in the art.

Figure 5:
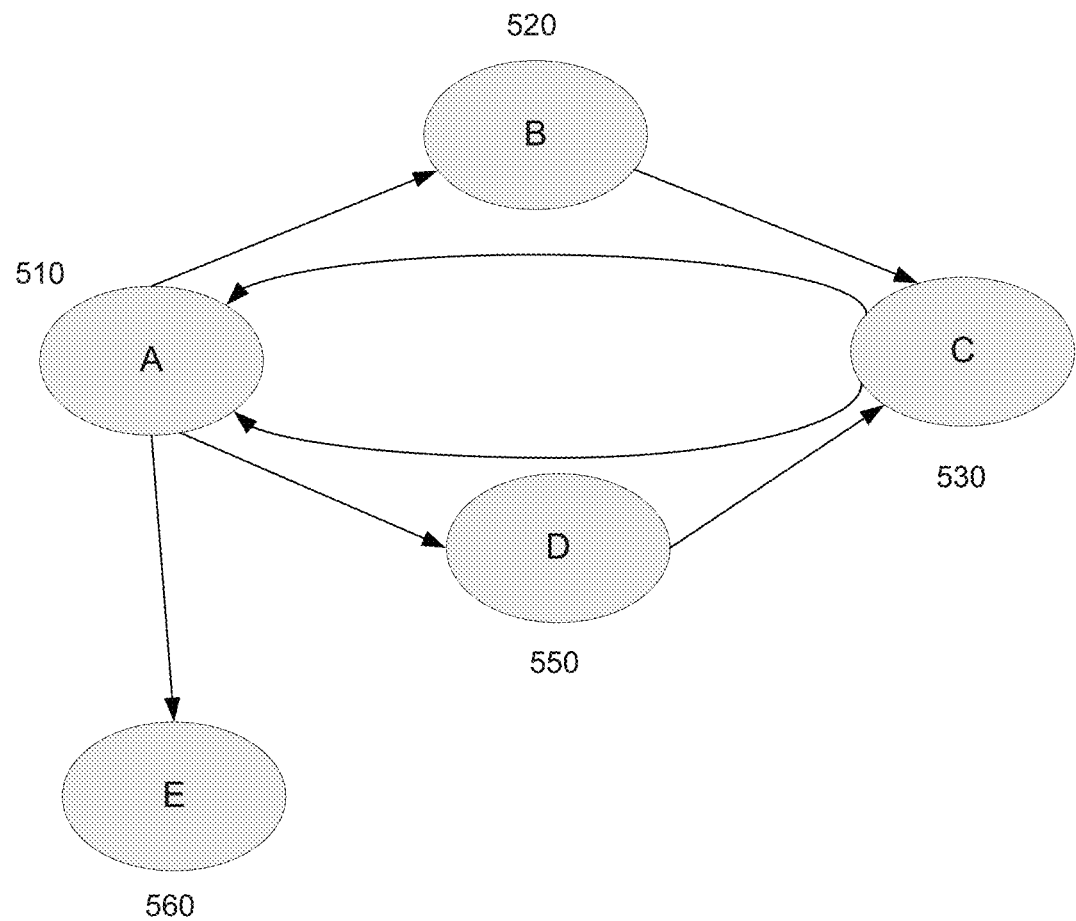
FIG. 5 is a flow diagram depicting an example update flow proof, according to at least one other example.

As shown in FIG. 5, listing 410 may be related to an item identified by item identifier 411. The listing 410 may be stored, for example, in a data store or downstream service as described further herein. Listing 410 may also include a number of attribute identifiers 412, 422, 432, 442 for various attributes associated with the item, e.g. price, inventory, weight, etc. Each of attribute identifiers 412, 422, 432, 442 may be associated with a corresponding current state 414, 424, 434, 444, such as specific values for price, inventory, weight, etc.

As also shown in FIG. 4, update instruction 450 may be related to an item identified by item identifier 441. The update instruction 450 may be generated, for example, by APIs that the merchants use to access the data store, by the data store based on other and/or incomplete instructions received from the merchant, or other methods known in the art. Update instruction 450 may also include a priority identifier 452, indicating a relative priority of the update included in the instruction, as well as a merchant identifier 453 indicating an originating merchant (or user) for the update instruction 450.

The update instruction 450 may also include a number of attribute identifiers 462, 472, for various attributes associated with the item and subject to change by the update instruction, e.g. price, inventory, weight, etc. Each of attribute identifiers 462, 472, may be associated with a corresponding initial state 464, 474, such as specific last-known values for price, inventory, weight, etc.

In some examples, update instruction 450 may include final states 466, 476, indicating changes to the initial states 464, 474. Such values may be generated and/or applied, for example, by the submitting merchant, by the receiving and/or sending data store and/or by the receiving downstream service.

As will be appreciated considering FIG. 4, and the various discussions provided herein, systems and methods may be configured to determine whether to apply a certain update instruction, such as update instruction 450, or individual instructions therein, to a data store or downstream service listing, such as listing 410, based at least in part on the item identifier, attribute identifier, initial state and/or current state information, e.g. by comparing initial state information for a given item and attribute from update instruction 450 with current state for the same information attribute in transaction record 480. In some examples, if initial state in the update instruction does not match the current state in the transaction record, the update will be buffered and/or eventually rejected. As discussed further below, the inventors have proven this to be a reliable method by which an eventually consistent database may be maintained.

FIG. 5 illustrates aspects of the proof by which aspects of the foregoing methodology may be verified. Note that there can be many edges between 2 nodes, because there can be multiple events which have the same transition. For a directed graph, the number of head endpoints adjacent to a node is called the "indegree" of the node and the number of tail endpoints adjacent to a node is its "outdegree." A simple example is node B (520) having one indegree (from node A 510) and one outdegree (to node C 530).

The proof involves three claims:

1) For the initial node, indegree will always be one less than outdegree (this is where an update chain starts from). In some cases, there may be edges back to the starting node, so the indegree may be more than 0. But as it is the starting point, indegree=outdegree−1

2) For the final state node, the indegree will be one more than the outdegree. One can go to and from the final state, transition to other states and so on, but the final state node will always have the indegree 1 greater than the outdegree.

3) All other nodes in the graph have indegree=outdegree.

Given these three conditions, the algorithm can be viewed as doing a graph traversal starting from the initial starting node (as initial state of any event must be the initial state of the database, so consuming a message like traversing an edge from the current state of the system (current graph vertex) to a next state (ending state of the event)).

This graph traversal can also be viewed as removing edges from the graph one by one (whether by consuming events from the event queue or the redrive queue) as events are consumed. One each transition through a vertex, the indegree and outdegree of a vertex both decreases by 1.

When can this graph traversal end? This will end when we come to a node which only has one incoming edge and no outgoing edge. This can only be the final state node, because all other nodes have indegree=outdegree.

Thus, the algorithm will end at the desired final state. Turning back to FIG. 5, it can be seen that node A (510) is the initial node, and includes 2 indegrees and 3 outdegrees, which satisfies indegree=outdegree −1.

Nodes B (520) and D (550) each have 1 indegree and 1 outdegree, and node C (530) has 2 indegrees and 2 outdegrees, which all satisfies indegree=outdegree.

Node E (560) is the final state and includes only 1 indegree, which satisfies indegree=outdegree+1.

This can also be demonstrated using the following example.

Let us say the possible states are:
A, B, C, D, E, with a starting state of A;
and the actual state transitions are (in order)
1. A->B
2. B->C
3. C->A
4. A->D
5. E->C
6. C->A
7. A->E Looking at the final step 7: E should be the final state and we should converge to E after any ordering of receiving these messages.

The following shows an exemplary algorithm run with a number of permutations of these messages, coming in any order, with the states of the event queue, the database and the redrive queue.

| First event example permutation | | | | | |
|---|---|---|---|---|---|
| Event | IsRedriveMessage | Database initial state | Database final state | Redrive Queue initial state | Redrive Queue final state |
| B->C | No | A | A | Null | B->C |
| C->A | No | A | A | B->C | B->C, C->A |
| D->C | No | A | A | B->C, C->A | B->C, C->A, D->C |
| B->C | Yes | A | A | B->C, C->A, D->C | B->C, C->A, D->C |
| A->D | No | A | D | B->C, C->A, D->C | B->C, C->A, D->C |
| A->B | No | D | D | B->C, C->A, D->C | B->C, C->A, D->C, A->B |
| C->A | No | D | D | B->C, C->A, D->C, A->B | B->C, C->A, D->C, A->B, C->A |
| C->A | Yes | D | D | B->C, C->A, D->C, A->B, C->A | B->C, C->A, D->C, A->B, C->A |
| D->C | Yes | D | C | B->C, C->A, D->C, A->B, C->A | B->C, C->A, A->B, C->A |
| C->A | Yes | C | A | B->C, C->A, A->B, > A->B, C->A | B->C, C->A, A->B, C->A |
| A->E | No | A | E | B->C, C->A, A->B | B->C, C->A, A->B |
| B->C | Yes | E | E | B->C, C->A, A->B | B->C, C->A, A->B |
| A->B | Yes | E | E | B->C, C->A, A->B | B->C, C->A, A->B |
| ... | Yes | E | E | B->C, C->A, A->B | B->C, C->A, A->B |

In this example, there are 3 messages in the queue at the end, which will expire because the algorithm converged to the correct state.

Another example:

First event example permutation

| Event | IsRedriveMessage | Database initial state | Database final state | Redrive Queue initial state | Redrive Queue final state |
|---|---|---|---|---|---|
| B->C | No | A | A | Null | B->C |
| C->A | No | A | A | B->C | B->C, C->A |
| D->C | No | A | A | B->C, C->A | B->C, C->A, D->C |
| A->E | No | A | E | B->C, C->A, D->C | B->C, C->A, D->C |
| A->B | No | E | E | B->C, C->A, D->C | B->C, C->A, D->C, A->B |
| B->C | Yes | E | E | B->C, C->A, D->C, A->B | B->C, C->A, D->C, A->B |
| A->D | No | E | E | B->C, C->A, D->C, A->B | B->C, C->A, D->C, A->B, A->D |
| C->A | No | E | E | B->C, C->A, D->C, A->B, A->D | B->C, C->A, D->C, A->B, A->D, C->A |
| ... | Yes | E | E | B->C, C->A, D->C, A->B, A->D, C->A | B->C, C->A, D->C, A->B, A->D, C->A |

Figure 6:
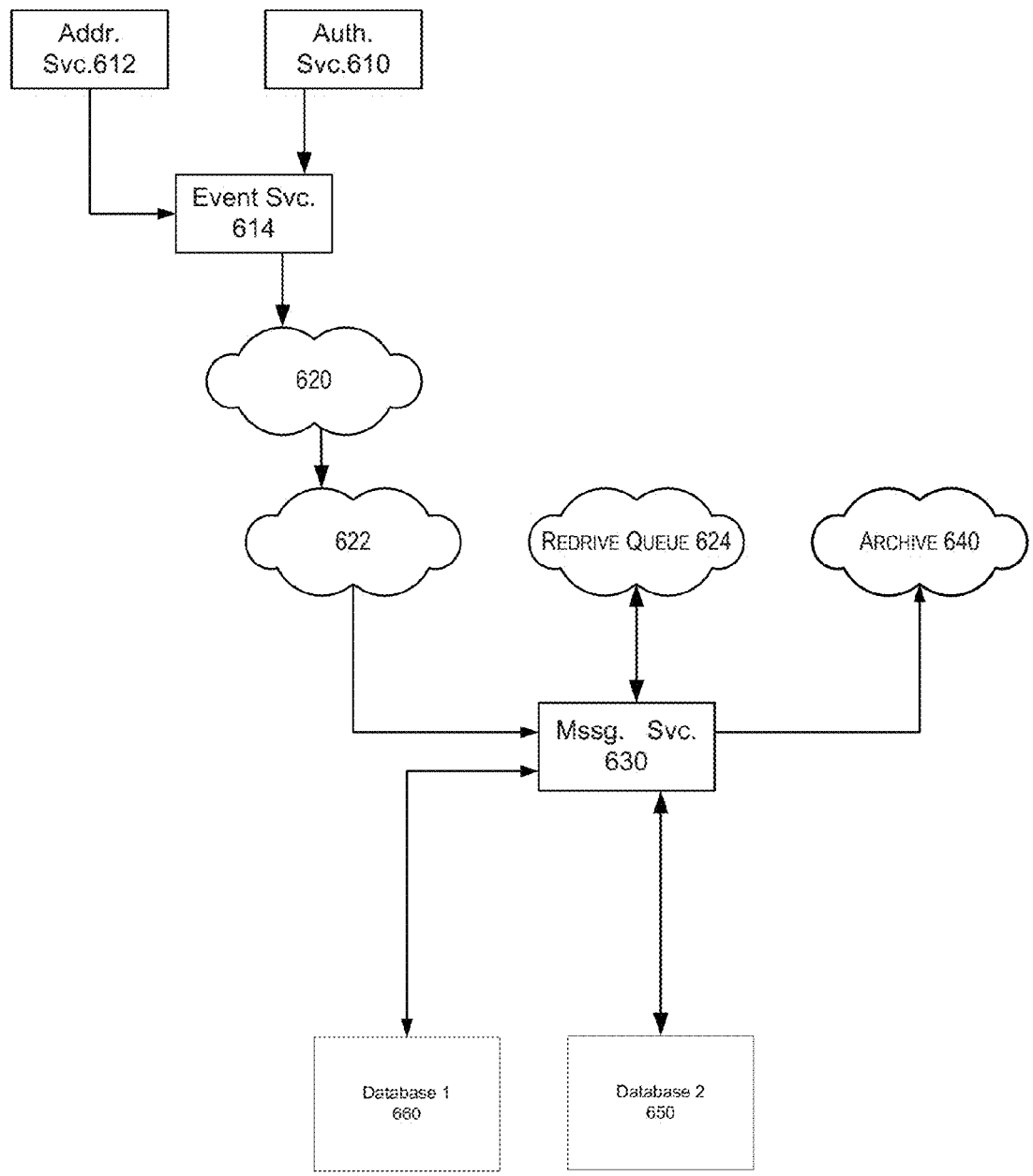
FIG. 6 illustrates an example architecture for implementing a multi-tenant database described herein, according to at least one other example.

Again the algorithm converged with the 6 remaining messages in the redrive queue which will die. The final state in the database is E, which is the required final state FIG. 6 illustrates aspects of an example environment 600, including a variety of services and service modules, for implementing techniques in accordance with various embodiments. The environment 600 includes, for example, authentication service 610 and address service 612 that provide update information to customer event service 614. Authentication service 610 may be used, for example, to processing user/customer information, including, for example, information about customer status changes, email changes, name changes, address changes, etc. There may be any number of authentication services that address these issues, and they may represent merchant/users and/or downstream services as shown in FIG. 1.

The customer event service 614 may provide instructions to a customer queue 622 via a network, web service and/or queue 620. By way of example, queue 622 may represent Simple Queue Service (SQS). The SQS can provide simple and cost-effective decoupling of the components of a cloud application. SQS can be used to transmit different volumes of data, at different levels of throughput, without losing messages or requiring other services to be always available. The remaining components in FIG. 6 are described in the context of an SQS system, although it should be noted that the concepts described herein may find applicability in any number of other web-based services.

In some examples, the customer event service 614 and/or queue 622 may be configured to apply a wrapper to update instructions received from authentication service 610 and/or address service 612 prior to forwarding the instructions on to consolidated message handling service 630. The message wrapper may include state information as discussed herein as well as any other processing information that may be relevant, e.g. merchant ID, cryptographic keys, etc.

SQS customer queue 622 provides instructions to a consolidated service 630, which also communicates with any number of redrive queue(s) 624 and/or archive queue(s) 640. As discussed previously, the redrive queue, such as 624, may be used, for example, to buffer update instructions with initial state information that does not match current state information in either of first database 660 or second database 650.

In some examples, first database 660 may represent one or more databases that are maintained as data stores by the service provider, and that include listings and/or information objects as discussed here. In some examples, second database 650 may represent one or more databases maintained by downstream services as also discussed herein.

In some examples, rather than deleting expired update instructions, they may be sent to an archive 640, such as a DLQ (dead letter queue). This may be beneficial, for example, in guaranteeing that data records can be recovered despite accidental or malicious disruptions that may cause problems with orderly processing of updates. By maintaining a full record of all expired updates, instructions that were inadvertently dumped may be retrieved later on for analysis and/or reconstruction of the database.

Figure 7:
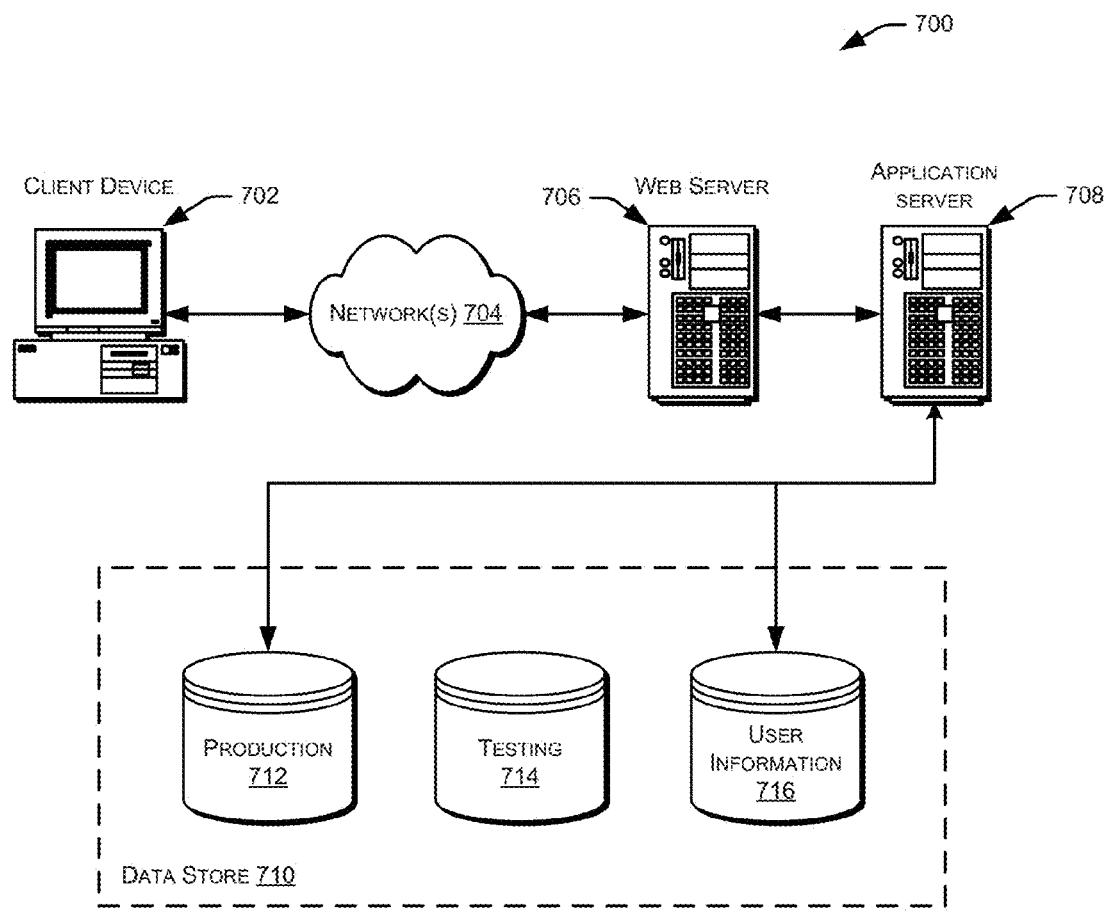
FIG. 7 illustrates an example architecture for implementing web service support as described herein, according to at least one other example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
presenting, by a computer system, an electronic marketplace managed by a service provider, the electronic marketplace hosting a plurality of merchants and including a data store with listings for items that the plurality of merchants are offering, at least a subset of the listings including a plurality of information attributes;
receiving a first update instruction from one of the merchants via an update queue, the first update instruction including at least an item identifier associated with one of the listings in the data store, an information attribute identifier, a first initial state, and a first final state;
comparing the first initial state of the first update instruction to a current state of the one of the listings in the data store;
at least one of:
if the first initial state of the first update instruction matches the current state, modifying the current state to match the first final state of the first update instruction; or
if the first initial state of the first update instruction does not match the current state, sending the first update instruction to a redrive queue, from which the first update instruction is configured to be reprocessed at a later time;
receiving a second update instruction from the redrive queue, the second update instruction including at least the item identifier, the information attribute identifier, a second initial state, and a second final state;
comparing the second initial state of the second update instruction to the current state of the one of the listings; and
at least one of:

if the second initial state of the second update instruction matches the current state, modifying the current state to match the second final state of the second update instruction; or if the second initial state of the second update instruction does not match the current state, sending the second update instruction back to the redrive queue.

2. The computer-implemented method of claim 1, further comprising forwarding the first update instruction to at least one downstream service based at least in part on whether the current state is modified to match the first final state.

3. The computer-implemented method of claim 2, wherein the at least one downstream service is configured to periodically pull update instructions from the data store and to execute update instructions that it receives from the data store.

4. The computer-implemented method of claim 2, wherein the at least one downstream service is configured to determine whether to execute update instructions that it receives from the data store based at least in part on whether initial state information included in the update instructions matches current state information in the at least one downstream service.

5. The computer-implemented method of claim 1, further comprising receiving a third update instruction including at least the item identifier; wherein the first update instruction is an instruction to modify an existing listing and the third update instruction is an instruction to create a new listing, and wherein the data store sends the first update instruction to the redrive queue until the new listing is created based at least in part on the third update instruction.

6. The computer-implemented method of claim 1, further comprising setting a timeout value, and determining whether to delete the first update instruction based at least in part on a time that the first update instruction has been maintained in the redrive queue and the timeout value.

7. The computer-implemented method of claim 1, wherein the data store is configured to separate the first update instruction for independent execution from a plurality of update instructions received together from the merchant.

8. The computer-implemented method of claim 1, wherein the data store is configured to execute the first update instruction and the second update instruction independent of an order in which the first and second update instructions were received by the computer system.

9. A system, comprising:
a memory that stores computer-executable instructions; and
a processor configured to access the memory and execute the computer-executable instructions to collectively at least:
present a web service managed by a service provider, the web service hosting a plurality of users and including a data store with information objects associated with the plurality of users, at least a subset of the information objects including a plurality of information attributes;
receive a first update instruction from one of the plurality of users, the first update instruction including at least an object identifier associated with one of the information objects in the data store, an information attribute identifier, an initial state, and a final state;
compare the initial state to a current state of the one of the information objects; and
at least one of:

if the initial state and the current state match, modify the current state to match the final state; or if the initial state and the current state do not match, send the first update instruction to a redrive queue, from which the first update instruction is configured to be reprocessed at a later time.

10. The system of claim 9, the processor further configured to forward the first update instruction to at least one downstream service based at least in part on whether the current state is modified to match the final state.

11. The system of claim 10, wherein the at least one downstream service is configured to periodically pull update instructions from the data store and to execute all update instructions that it receives from the data store.

12. The system of claim 10, wherein the at least one downstream service is configured to determine whether to execute update instructions that it receives from the data store based at least in part on whether initial state information included in the update instructions matches current state information in the at least one downstream service.

13. The system of claim 10, wherein the web service includes a virtual storefront that is accessible by customers and that obtains information from the at least one downstream service about items corresponding to the information objects and offered for sale by the plurality of users.

14. The system of claim 9, wherein the processor is further configured to receive a second update instruction including at least the object identifier; wherein the first update instruction is an instruction to modify an existing information object and the second update instruction is an instruction to create a new information object, and wherein the data store sends the first update instruction to the redrive queue until a new information object is created based at least in part on the second update instruction.

15. The system of claim 9, wherein the processor is further configured to set a timeout value, and determine whether to delete the first update instruction based at least in part on a time that the first update instruction has been maintained in the redrive queue and the timeout value.

16. A system, comprising:
a memory that stores computer-executable instructions; and
a processor configured to access the memory and execute the computer-executable instructions to collectively at least:
present a web service managed by a service provider, the web service hosting a plurality of users and including a data store with information objects associated with the plurality of users, each of the information objects including a plurality of information attributes;
receive a plurality of messages including update instructions from the plurality of users, at least a subset of the update instructions including at least an object identifier associated with one of the information objects in the data store, an information attribute identifier, an initial state, and a final state;
process the update instructions, independent of an order in which the plurality of messages were received, based at least in part on comparing each of the initial states included in the update instructions to a current state of the one of the information objects; and
at least one of:
if the initial state of a particular update instruction and the current state are the same, modify the current state to match the final state of the particular update instruction; or if the initial state of the particular update instruction and the current state are not the same, send the particular update instruction to a redrive queue, from which the particular update instruction may be reprocessed at a later time.

17. The system of claim 16, wherein the processor is further configured to send at least a subset of the update instructions to one or more downstream services, the web service includes a web page accessible by customers to purchase items associated with the information objects, and wherein the web page retrieves information from information objects maintained by the one or more downstream services.

18. The system of claim 17, wherein the one or more downstream services are configured to periodically pull the update instructions from the data store and to execute all update instructions that they receive from the data store.

19. The system of claim 16, wherein the processor is further configured to set a timeout value, and determine whether to delete at least one of the update instructions based at least in part on a time that the at least one of the update instructions has been maintained in the redrive queue and the timeout value.

20. The system of claim 16, wherein the processor is further configured to separate the particular update instruction for independent execution from a plurality of update instructions received together from one of the users.

21. A computer-readable storage device storing computer-executable instructions that, when executed by one or more computer systems, configure the one or more computer systems to perform operations comprising:
   presenting a web service managed by a service provider, the web service hosting a plurality of users and including a data store with listings of items associated with the plurality of users, each of the listings including a plurality of information attributes;
   receiving a plurality of messages including update instructions from the users, each of the update instructions including at least an item identifier associated with one of the listings in the data store, an information attribute identifier, an initial state, and a final state;
   processing the update instructions, independent of an order in which the plurality of messages were received, based at least in part on comparing at least a subset of the initial states included in the update instructions to a current state of the one of the listings;
   applying at least one of the update instructions for which the initial state matches the current state, wherein applying the at least one of the update instructions includes modifying the current state to match the final state of the at least one of the update instructions; and
   sending at least one other update instruction of the update instructions for which the initial state is not the same as the current state to a redrive queue.

22. The computer-readable storage device of claim 21, wherein the web service includes a web page accessible by customers to purchase items of the listing, and the web page retrieves information from at least one of the listings maintained by the data store or listings maintained by one or more downstream services.

23. The computer-readable storage device of claim 21, further comprising instructions for setting a timeout value, and determining whether to delete the at least one other update instruction of the update instructions based at least in part on a time that the at least one other update instruction of the update instructions has been maintained in the redrive queue and the timeout value.

24. The computer-readable storage device of claim 21, further comprising instructions for sending the at least one of the update instructions that is applied to one or more downstream services, wherein the web service includes a web page accessible by customers to purchase items, and the web page retrieves information from listings maintained by the downstream services.

25. The computer-readable storage device of claim 24, wherein the instructions for sending the at least one of the update instructions to the one or more downstream services are configured to respond to requests from the one or more downstream services for update instructions associated with certain items.

* * * * *

UNITED STATES PATENT AND TRADEMARK OFFICE
CERTIFICATE OF CORRECTION

PATENT NO. : 9,971,987 B1  
APPLICATION NO. : 14/224749  
DATED : May 15, 2018  
INVENTOR(S) : Soumyadip Banerjee, Ankit Saraswat and Prafulla Upadhyay Page 1 of 1

It is certified that error appears in the above-identified patent and that said Letters Patent is hereby corrected as shown below:

In the Claims

Column 24, Line 16, Claim 22:  
Delete: "customers to purchase items of the listing, and the webpage"  
Insert: --customers to purchase items of the listings, and the webpage--

Signed and Sealed this  
Twenty-fourth Day of July, 2018

Andrei Iancu  
*Director of the United States Patent and Trademark Office*